US010288836B2

(12) United States Patent
Shibasaki

(10) Patent No.: US 10,288,836 B2
(45) Date of Patent: May 14, 2019

(54) LENS APPARATUS

(71) Applicant: CANON KABUSHIKI KAISHA, Tokyo (JP)

(72) Inventor: Go Shibasaki, Utsunomiya (JP)

(73) Assignee: CANON KABUSHIKI KAISHA, Tokyo (JP)

(*) Notice: Subject to any disclaimer, the term of this patent is extended or adjusted under 35 U.S.C. 154(b) by 216 days.

(21) Appl. No.: 15/371,475

(22) Filed: Dec. 7, 2016

(65) Prior Publication Data

US 2017/0176712 A1 Jun. 22, 2017

(30) Foreign Application Priority Data

Dec. 22, 2015 (JP) ................................ 2015-249413

(51) Int. Cl.
*G02B 7/10* (2006.01)

(52) U.S. Cl.
CPC .................................... *G02B 7/10* (2013.01)

(58) Field of Classification Search
CPC ........................................................ G02B 7/10
USPC ......................................................... 359/700
See application file for complete search history.

(56) References Cited

FOREIGN PATENT DOCUMENTS

| | | | | |
|---|---|---|---|---|
| JP | S63237012 | A | | 10/1988 |
| JP | H07239435 | A | | 9/1995 |
| JP | 2000066076 | A | | 3/2000 |
| JP | 2006235418 | A | | 9/2006 |
| JP | 2013064848 | A | * | 4/2013 |
| JP | 2013213890 | A | | 10/2013 |

OTHER PUBLICATIONS

Office Action issued in Japanese Appln. No. 2015-249413 dated Jan. 23, 2018.

* cited by examiner

*Primary Examiner* — James R Greece
(74) *Attorney, Agent, or Firm* — Rossi, Kimms & McDowell LLP

(57) ABSTRACT

A lens apparatus includes: a movable barrel arranged in a fixed barrel and holding an optical element; a converter that moves the optical element in an optical axis direction by rotating the movable barrel to the fixed barrel about an optical axis; and an operating part supported to the fixed barrel rotatably about an axis perpendicular to the optical axis, and arranged such that the operating part is rotated from outside of the fixed barrel. The operating part includes an eccentric shaft having an axis different from the rotation axis of the operating part and protruding to the inner diameter side, the eccentric shaft engages with a straight groove provided on the movable barrel and in parallel with the optical axis, and rotation of the operating part rotates the movable barrel about the optical axis via the eccentric shaft to move the optical element in the optical axis direction.

4 Claims, 4 Drawing Sheets

LENS APPARATUS

BACKGROUND OF THE INVENTION

Field of the Invention

The present invention relates to a lens apparatus for adjusting the position of a movable lens unit in the optical axis direction relative to a fixed lens unit.

Description of the Related Art

In general, components included in a lens apparatus for photographing have dimension errors, and physical properties of an optical element also often have deviations from their design values. For this reason, a lens apparatus has heretofore been known in which the position of a movable lens unit is adjusted in the optical axis direction relative to a fixed lens unit to obtain desired optical performance. For example, Japanese Patent Application Laid-Open No. 2006-235418 discloses a lens apparatus in which a ring operation member arranged on the outer circumference of the lens apparatus is coupled with a rotation-straight movement converting mechanism such as a multiple thread to work together by using a connection pin. In this lens apparatus, the flange back is adjusted by rotating the ring operation member about the optical axis to move the optical element in the optical axis direction. In addition, Japanese Patent Application Laid-Open No. H07-239435 discloses an adjustment mechanism in which an engagement groove is provided on a side surface of a movable lens unit movable in the optical axis direction along a guide rail. In this adjustment mechanism, the flange back is adjusted by rotating an eccentric pin inserted in the engagement groove to move the movable lens unit in the optical axis direction. Such adjustment structures have been applied not only to flange back adjustments but also to various optical adjustments of lens apparatuses, such as an aberration adjustment.

Since a trend toward higher definition has been advancing recently for image pickup apparatuses, the lens apparatuses for photographing require an extremely high optical performance. Along with this trend, a high accuracy is required also for various adjustments of lens apparatuses. Accordingly, without an environment where precision measuring instruments and adjustment tools are available, sufficient adjustments cannot be performed in many cases. Although it is necessary for photographers to adjust such adjustment items, there are cases where easy adjustment operations are not preferable.

For example, when a lens apparatus of an interchangeable type is newly combined with another image pickup apparatus, a flange back adjustment must be necessary. However, at a photographing site, sufficient adjustments are difficult because accuracy of visual confirmation using a small monitor is limited. In such a case, it is desired that adjustment can be completed in advance at an environment where precision measuring instruments and adjustment tools are available and that an operation error or other factors which may easily cause a misalignment can be prevented at a photographing site.

However, if the adjustment mechanisms according to the related art mentioned above are used as an adjustment mechanism for the adjustment of the lens apparatus described above, there will be the following problems.

As a coping method to prevent an operation error from occurring at a photographing site, the most effective way is to cover the adjustment operating part with a cover member.

However, in an adjustment structure such as the one disclosed in Japanese Patent Application Laid-Open No. 2006-235418, the adjustment operating part extends around the whole outer circumference of the lens apparatus, and hence it is difficult to cover the whole adjustment operating part with a cover member. In other words, there are problems that the cover member would make the lens apparatus larger and would have a poor operability when being attached or detached for adjustment operation because the robustness necessary for the attachment strength of the cover member makes the structure complicated.

On the other hand, in an adjustment structure such as the one disclosed in Japanese Patent Application Laid-Open No. H07-239435, a change in the inclination of the movable lens unit in the moving direction tends to occur because the movable lens unit is driven by only a pin located in a single place. Since a change in the inclination of an optical element, in general, directly results in a poor optical performance, there is a problem on the stability of the performance. In addition, when a static pressure or a shock in the optical axis direction is applied to the movable lens unit, the load is received by only a single portion, which is a pin engagement part, and deformation in or damage to the components are likely to occur. Thus, there is a problem that the resistance to a static pressure and a shock is low.

SUMMARY OF THE INVENTION

An object of the present invention is to provide a lens apparatus including a position adjustment mechanism for a movable lens unit in the optical axis direction, in which an adjustment operating part of the adjustment mechanism is made small to conserve space, and the orientation stability of the movable lens unit and the resistance to a static pressure and a shock in the optical axis direction are excellent.

To attain the above object, a lens apparatus of the present invention includes: a movable barrel that is arranged on an inner diameter side of a fixed barrel and holds an optical element; a converting mechanism that moves the optical element in a direction of an optical axis by rotating the movable barrel relative to the fixed barrel about the optical axis; and an operating part that is supported to the fixed barrel rotatably about a rotation axis perpendicular to the optical axis, and is arranged such that the operating part can be rotated from an outside of the fixed barrel. The operating part includes an eccentric shaft part that has a center axis different from the rotation axis of the operating part and protrudes to the inner diameter side, the eccentric shaft part is engaged with a straight groove provided on an outer circumference of the movable barrel and in parallel with the optical axis, and rotation of the operating part about the rotation axis rotates the movable barrel about the optical axis via the eccentric shaft part and changes a position of the optical element in the direction of the optical axis.

According to the present invention, it is possible to provide a lens apparatus including a position adjustment mechanism for a movable lens unit in the optical axis direction, in which an adjustment operating part of the adjustment mechanism is made small to conserve space, and the orientation stability of the movable lens unit and the resistance to a static pressure and a shock in the optical axis direction are excellent.

Further features of the present invention will become apparent from the following description of exemplary embodiments with reference to the attached drawings.

DESCRIPTION OF THE EMBODIMENTS

Preferred embodiments of the present invention will now be described in detail based on an example illustrated in FIGS. 1 to 5.

Example 1

Figure 1:
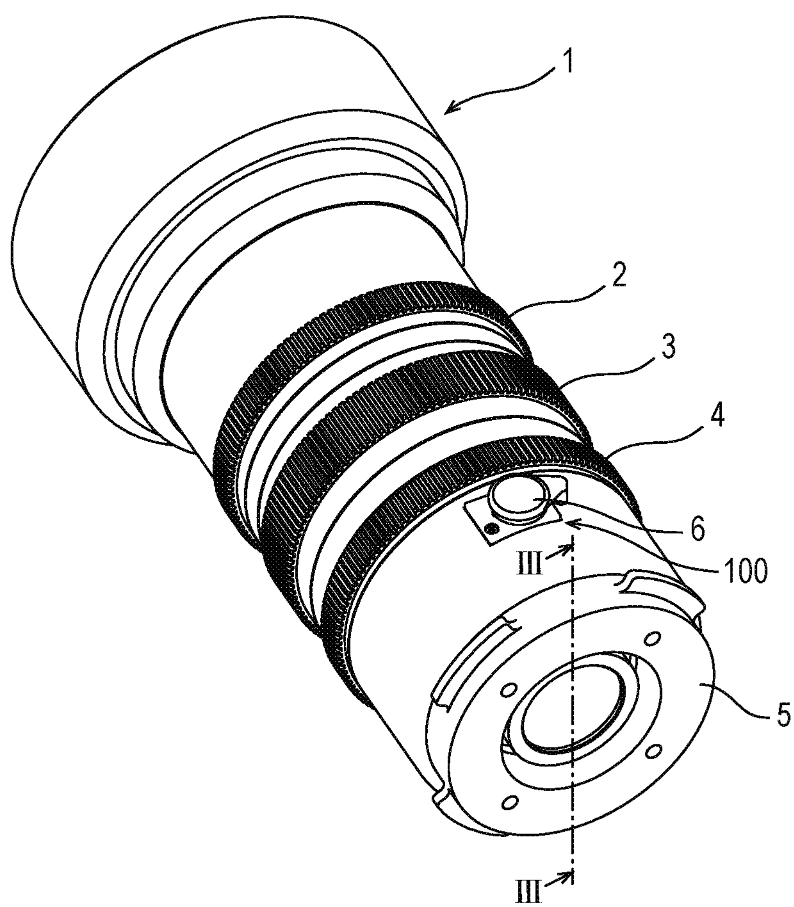
FIG. 1 is a schematic external view of a lens apparatus according to the present invention.

This example illustrates a case where the present invention is applied to a flange back adjustment mechanism of a lens apparatus to be attached to an image pickup apparatus. FIG. 1 is a perspective external view of a lens apparatus 1 to which the present invention is applied. The lens apparatus 1 is capable of focus adjustment, magnification, and light quantity adjustment by manual operation and is provided with a focus ring 2, a zoom ring 3, and an iris ring 4 at the outer circumference for the respective operations. The lens apparatus 1 has a lens mount 5 at an end thereof, which is attachably and detachably connected to a mounting part of an image pickup apparatus not illustrated. The lens apparatus 1 has a flange back adjustment part 100 provided on a part of the outer circumference between the iris ring 4 and the lens mount 5. The top face of the flange back adjustment part 100 is covered with a rubber cap 6 and has a structure in which an adjustment knob 10 and a lock screw (lock member) are exposed by detaching the rubber cap 6. The structure of the flange back adjustment part 100 will be described in detail below.

Figure 2:
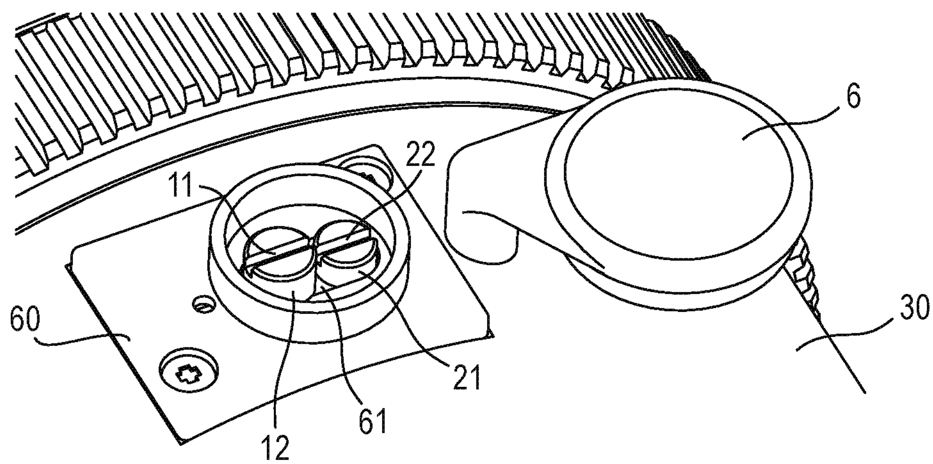
FIG. 2 is an enlarged external view of an adjustment operating part of the lens apparatus according to the present invention.
Figure 3:
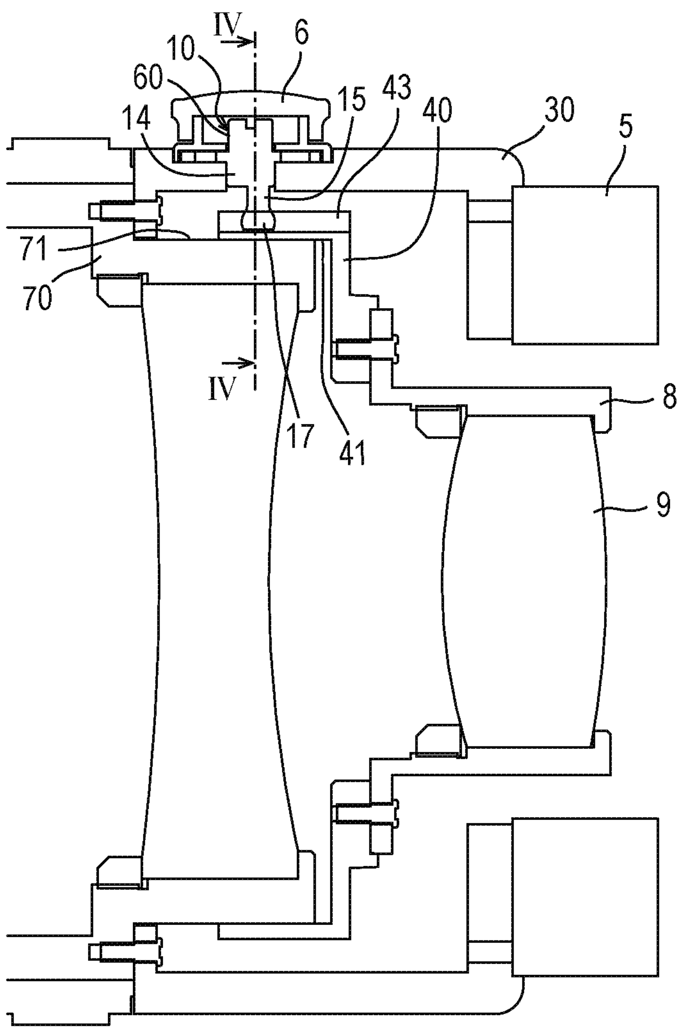
FIG. 3 is a cross-sectional view of the adjustment operating part of the lens apparatus according to the present invention taken along line III-III in FIG. 1.
Figure 4:
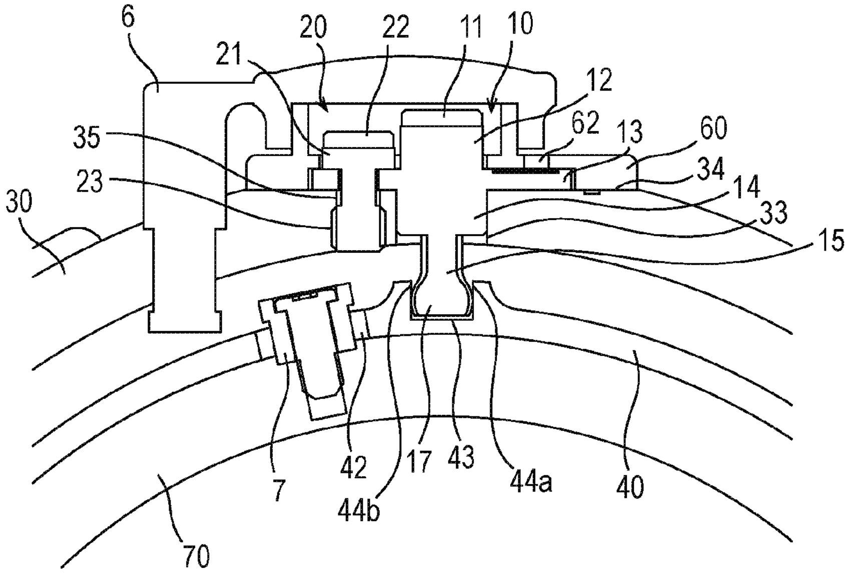
FIG. 4 is a cross-sectional view of the adjustment operating part of the lens apparatus according to the present invention taken along line IV-IV in FIG. 3.
Figure 5:
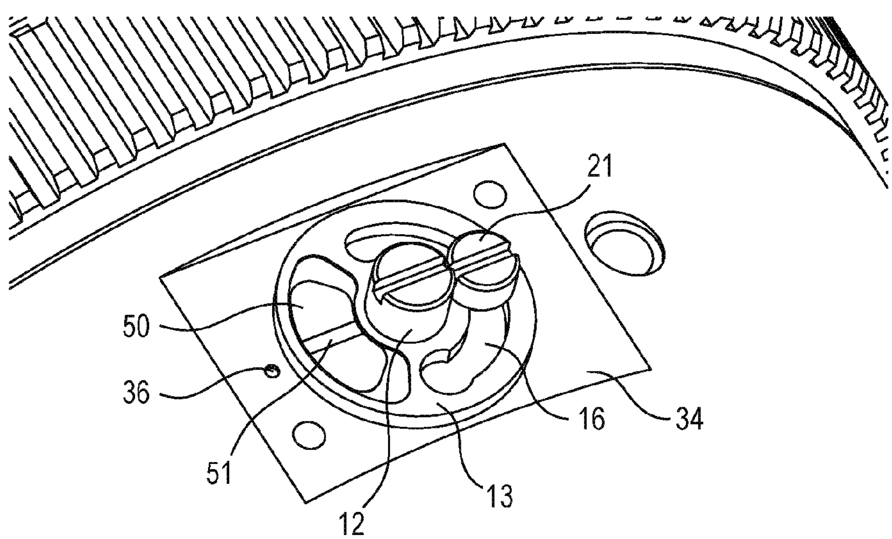
FIG. 5 is an enlarged perspective view of a main part illustrating an extracted part of an adjustment structure of the lens apparatus according to the present invention.

FIG. 2 is an enlarged view of the flange back adjustment part, FIG. 3 is a cross-sectional view taken along line III-III shown in FIG. 1, and FIG. 4 is a cross-sectional view taken along line IV-IV shown in FIG. 3. In addition, FIG. 5 illustrates a state where a cover member 60 is removed from the flange back adjustment part 100 for explaining the internal structure. Both a fixed lens barrel 70 and a fixed barrel 30 are immovable, stationary members and connected to each other with multiple connecting screws. In addition, the lens mount 5 is connected to the fixed barrel 30 with multiple connecting screws. A lens unit (optical element) 9 held in a lens barrel 8 is a flange back adjustment optical system, and the flange back can be adjusted by moving the lens unit 9 in the optical axis direction. The lens barrel 8 is fixed to a movable barrel 40, and both move together.

An inner diameter fitting part 41 of the movable barrel 40 is fitted on an outer diameter fitting part 71, which is a part of a fixed lens barrel 70, such that the movable barrel 40 can slide smoothly both in the optical axis direction and in the rotational direction about the optical axis. On the outer diameter fitting part 71 of the fixed lens barrel 70, cam pins 7 extending in the direction perpendicular to the optical axis are fixed at intervals of 120 degrees around the optical axis as illustrated in FIG. 4. Three cam pins 7 are engaged in the same phase with three cam grooves 42 provided on the movable barrel 40 and are capable of sliding in the cam grooves 42 smoothly. Note that the diameter of each of the three cam pins 7 is adjusted to the corresponding cam groove 42 that the cam pin 7 is to be engaged with before being assembled, so that there is nearly no play between the cam pin 7 and the cam groove 42.

With the structure described above, when the movable barrel 40 is rotated about the optical axis, the three cam grooves 42 serve as guides and the position of the movable barrel 40 in the optical axis direction moves by the amount corresponding to the rotation.

Meanwhile, the adjustment knob 10, which is a flange back adjustment operation member, includes an operating part 12 with a groove part 11, a disc part 13, a rotating shaft part 14, and an eccentric shaft part 15 which is in parallel with a rotating shaft part 14 in the longitudinal direction and the center thereof is eccentric, as illustrated in FIG. 4. In other words, the rotating shaft part 14 and the eccentric shaft part 15 are designed to have different center axes. The groove part 11 of the operating part 12 is provided for inserting a tool such as a slotted screwdriver from the outside of the fixed barrel 30 to perform rotating operation with the rotating shaft part 14 as an axis when performing adjustment operation. The adjustment knob 10 is supported by the fixed barrel 30 so as to be capable of smoothly rotating about the rotation axis of the rotating shaft part 14, with the rotating shaft part 14 of the adjustment knob 10 being engaged with a hole 33 provided in the fixed barrel 30 and with the disc part 13 being in contact with a flat surface 34 on the outer circumference of the fixed barrel 30. Here, the hole 33 provided in the fixed barrel 30 extends in the direction of an axis perpendicular to the optical axis. The disc part 13 has an arc hole 16 of about 180 degrees provided as a through hole, in the middle of which the lock screw 20 is inserted.

The lock screw 20 has a groove part 22 formed on a head part 21 thereof in the same way as in the adjustment knob 10, and the opposing distal end 23 screws into a screw hole 35 provided in the fixed barrel 30. The groove part is provided for inserting a tool such as a slotted screwdriver to rotate the lock screw 20. When the lock screw 20 is rotated in the forwarding direction to the inner diameter side, and the distal end 23 is screwed further into the screw hole 35, the adjustment knob 10 (disc part 13) is non-rotatably held, with the disc part 13 of the adjustment knob 10 clamped between the flat surface 34 on the outer circumference of the fixed barrel 30 and the head part 21 of the lock screw 20. Thus, the rotational position of the disc part 13 relative to the fixed barrel 30 can be fixed. An indication sticker 50 is attached at the position opposite side of the center of the disc part 13 from the lock screw 20. Note that the indication sticker 50 has an indication line 51 printed thereon and is attached such that the position of the indication line 51 agrees with a reference mark 36 inscribed on the flat surface 34 of the fixed barrel 30 in an adjustment reference state where the flange back adjustment optical system is positioned substantially at the center of the adjustment range.

The cover member 60 fixed to the fixed barrel 30 so as to cover the disc part 13 of the adjustment knob 10 is provided with a through hole 61 to expose the operating part 12 of the adjustment knob 10 and the lock screw 20. In addition, a small hole 62 is provided in the cover member 60 at the position where the phase agrees with the indication line 51 of the indication sticker 50.

The eccentric shaft part 15 having a center axis different from that of the rotating shaft part 14 extends (protrudes) from the rotating shaft part 14 in the direction approaching the optical axis (toward the inner diameter side), and is engaged around the distal end with a straight groove 43, which is provided on the outer circumference of the movable barrel 40 and is in parallel with the optical axis. In the adjustment reference state where the flange back adjustment optical system is positioned almost at the center of the adjustment range, the adjustment knob 10 is in a state where the distance in the optical axis direction between the center axis of the rotating shaft part 14 and that of the eccentric shaft part 15 is farthest. An engagement part 17 engaged with the straight groove 43 at the distal end is formed substantially in a spherical shape. In other words, the distal end on the inner diameter side (the optical axis side) of the eccentric shaft part 15 is substantially in a circular shape in cross section perpendicular to the rotating shaft part 14 of the operating part. Note that the expression "substantially in a spherical shape" or "substantially in a circle shape" means a shape in which the variation of the distance (radius) from the center to the circumference is within 3 percent.

Hereinafter, a method of a flange back adjustment in the lens apparatus with the above structure will be described. First, the rubber cap 6 of the flange back adjustment part 100 is detached (made in an uncovering state), and the exposed lock screw 20 is loosened by using a tool such as a slotted screwdriver. Loosening the lock screw 20 releases the holding of the disc part 13 of the adjustment knob 10, and makes the adjustment knob 10 in a rotatable state. Next, using a tool such as a slotted screwdriver, the operating part 12 of the adjustment knob 10 exposed from the through hole 61 of the cover member 60 is rotated. Since the rotation range is limited by the lock screw 20 coming in contact with an end of the arc hole 16, the rotation range is about 90 degrees clockwise and about 90 degrees counterclockwise from the adjustment reference state. When the adjustment knob 10 rotates, the eccentric shaft part 15 moves through an arc path about the center axis of the rotating shaft part 14. Since the straight groove 43 of the movable barrel 40 engaged with the eccentric shaft part 15 extends in parallel with the optical axis, the movable barrel 40 does not receive operation force in the optical axis direction from the adjustment knob 10 when the eccentric shaft part 15 moves through the arc as described above. When the adjustment knob 10 rotates and the eccentric shaft part 15 moves through the arc, the movable barrel 40 receives operation force in a tangential direction of the arc centered on the optical axis at the contact point between the engagement part 17 of the adjustment knob 10 and the straight groove 43. Since the movable barrel 40 is engaged with the fixed lens barrel 70 on the inner diameter fitting part 41 and movement in the tangential direction described above is restricted, the movable barrel 40, receiving the operation force in the tangential direction, rotates about the optical axis.

Here, since the eccentric shaft part 15 moves through the arc path, the point on the engagement part 17 of the eccentric shaft part 15 which is in contact with the straight groove 43 is not always the same, and the contact point changes during the movement. In addition, the movable direction of the movable barrel 40 is different from the movement direction of the eccentric shaft part 15. This factor is also a reason the contact point on the engagement part 17 with the straight groove 43 changes during the movement. In this example, since the engagement part 17 of the eccentric shaft part 15 is substantially in the spherical shape, the engagement dimension can be kept constant regardless of the change of the contact point described above. In addition, along with the movement of the eccentric shaft part 15 through the arc path, the distance from the optical axis center to the engagement part 17 also changes during the movement. In this example, both side walls 44*a* and 44*b* of the straight groove 43 are in parallel with the plane connecting the center of the straight groove and the optical axis, as illustrated in FIG. 4, so that the engagement dimension can be kept constant regardless of the change described above in the distance from the optical axis center to the engagement part 17.

When the movable barrel 40 rotates about the optical axis, the position of the movable barrel 40 in the optical axis direction moves according to the rotation amount, with the rotation-straight movement converting mechanism including the engagement of the three pairs of the cam groove 42 and the cam pin 7 (cam mechanism), as described earlier. Since the movable barrel 40 and the lens barrel 8 moving together in the optical axis direction changes the back focus, the flange back can be adjusted by rotating the adjustment knob 10 described above. After the flange back adjustment optical system is adjusted to an appropriate position, the adjustment knob 10 is fixed by fastening the lock screw 20 so that the adjustment position does not change. Finally, the rubber cap 6 of the flange back adjustment part 100 is pressed in and the flange back adjustment operation is completed.

Note that in the case where the position of the flange back adjustment optical system needs to be moved back to the adjustment reference position before the adjustment due to a failure in a flange back adjustment or other reasons, the adjustment knob 10 only needs to be returned back to the position where the indication line 51 of the indication sticker 50 attached to the disc part 13 of the adjustment knob 10 can be seen through the small hole 62 in the cover member 60. By rotating the adjustment knob 10 and fastening the lock screw 20 at the position where the indication line 51 can be seen through the small hole 62, it is possible to move the flange back adjustment optical system back to the adjustment reference position.

As described above, according to the lens apparatus of this example, the flange back adjustment operating part such as the adjustment knob and the lock screw can be made small enough to be covered with the single rubber cap and can be arranged in a small space. In addition, since the movable barrel of the flange back adjustment optical system is supported by the engagement of the cam pins and the cam grooves at three locations, the lens apparatus has a strong resistance to static pressure and shocks in the optical axis direction. Moreover, since the play in the rotation-straight movement converting mechanism is reduced by the adjustment of the engaging diameters of the cam pins at the three locations, it is possible to reduce deterioration of the optical performance caused by the inclination of the flange back adjustment optical system.

In the example described above, the rotation-straight movement converting mechanism, in which the movable barrel moves in the optical axis direction while rotating, includes the engagement between the stationary cam pins and the cam grooves on the movable barrel. However, a rotation-straight movement converting mechanism applicable to the present invention is not limited to this structure. For example, a rotation-straight movement converting mechanism may be a transfer mechanism (helicoid mechanism) using a multiple thread, a cam mechanism having a cam shape on the contact surface in the optical axis direction between a fixed lens unit and a movable barrel, or the like. In the case where a cam mechanism including this example is used, the relation between the rotation amount of the adjustment knob and the movement amount of the adjustment optical system in the optical axis direction can be made linearly proportional, by applying nonlinear cam grooves to the cam mechanism. Moreover, instead of the movable barrel, including the engagement part engaged with the eccentric shaft part, moving in the optical axis direction, only the lens unit may be moved in the optical axis direction by the rotation of the movable barrel about the optical axis via the rotation-straight movement converting mechanism.

Furthermore, in the above example, the whole engagement part of the eccentric shaft part is substantially in a spherical shape. However, only an area of the engagement part that may come in contact with the straight groove of the movable barrel during adjustment operation may be substantially in the spherical shape, and the other area may be in a shape different from the spherical one.

Further, the present invention is applicable to a camera apparatus which includes an image pickup element and the lens apparatus which guides a light from an object to the image pickup element.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-249413, filed Dec. 22, 2015, which is hereby incorporated by reference herein in its entirety.

What is claimed is:

1. A lens apparatus comprising:
- a converting mechanism including:
  - a fixed barrel;
  - a movable barrel arranged inside the fixed barrel and holding an optical element, the movable barrel including a straight groove extending parallel with an optical axis of the optical element;
  - a cam mechanism or a helicoid mechanism configured to move the movable barrel relative to the fixed barrel in a direction of the optical axis, by rotating the movable barrel relative to the fixed barrel about the optical axis; and
- an operating member supported by the fixed barrel, rotatable about a rotation axis perpendicular to the optical axis, and arranged outside of the fixed barrel,
- wherein:
  - the operating member includes an eccentric shaft eccentric with respect to the rotation axis,
  - the eccentric shaft includes an engagement part engaged with the straight groove, the engagement part engaged with the straight groove being substantially circular in shape, and
  - rotation of the operating member about the rotation axis causes the engagement part engaged with the straight groove to rotate the movable barrel about the optical axis causes the converting mechanism to move the movable barrel relative to the fixed barrel in the direction of the optical axis.

2. The lens apparatus according to claim 1, further comprising a lock member secured to the fixed barrel to prevent the operating member from rotating.

3. The lens apparatus according to claim 2, further comprising a cover member that covers the operating member and the lock member.

4. A camera apparatus comprising:
- an image pickup element; and
- a lens apparatus configured to form an image on the image pickup element, and including:
  - a converting mechanism including:
    - a fixed barrel;
    - a movable barrel arranged inside the fixed barrel and holding an optical element, the movable barrel including a straight groove extending parallel with an optical axis of the optical element;
    - a cam mechanism or a helicoid mechanism configured to move the movable barrel relative to the fixed barrel in a direction of the optical, by rotating the movable barrel relative to the fixed barrel about the optical axis; and
- an operating member supported by the fixed barrel, rotatable about a rotation axis perpendicular to the optical axis, and arranged outside of the fixed barrel,
- wherein:
  - the operating member includes an eccentric shaft eccentric with respect to the rotation axis,
  - the eccentric shaft includes an engagement part engaged with the straight groove, the engagement part engaged with the straight groove being substantially circular in shape, and
  - rotation of the operating member about the rotation axis causes the engagement part engaged with the straight groove to rotate the movable barrel about the optical axis causes the converting mechanism to move the movable barrel relative to the fixed barrel in the direction of the optical axis.

* * * * *